(12) United States Patent
Zhang

(10) Patent No.: US 10,045,406 B2
(45) Date of Patent: Aug. 7, 2018

(54) SOLID-STATE LIGHTING APPARATUS FOR USE WITH FLUORESCENT BALLASTS

(71) Applicant: Cree, Inc., Durham, NC (US)

(72) Inventor: Jun Zhang, Cary, NC (US)

(73) Assignee: Cree, Inc., Durham, NC (US)

( * ) Notice: Subject to any disclaimer, the term of this patent is extended or adjusted under 35 U.S.C. 154(b) by 28 days.

(21) Appl. No.: 14/256,573

(22) Filed: Apr. 18, 2014

(65) Prior Publication Data
US 2014/0225520 A1    Aug. 14, 2014

Related U.S. Application Data

(63) Continuation-in-part of application No. 14/055,264, filed on Oct. 16, 2013, which is a continuation-in-part of application No. 13/943,455, filed on Jul. 16, 2013, now Pat. No. 9,439,249, application No. 14/256,573, (Continued)

(51) Int. Cl.
*H05B 33/08* (2006.01)

(52) U.S. Cl.
CPC ........ *H05B 33/0809* (2013.01); *Y02B 20/383* (2013.01)

(58) Field of Classification Search
None
See application file for complete search history.

(56) References Cited

U.S. PATENT DOCUMENTS

| 3,283,169 A | 11/1966 | Libaw |
| 4,210,846 A * | 7/1980 | Capewell ............ H05B 41/392 |
| | | 315/121 |
| 4,213,064 A | 7/1980 | Nagano |

(Continued)

FOREIGN PATENT DOCUMENTS

| CN | 1056950 C | 9/2000 |
| CN | 101725848 A | 6/2010 |

(Continued)

OTHER PUBLICATIONS

Impedance Matching, Nov. 16, 2012, http://en.wikipedia.org/w/index.php?title-impedance_matching&oldid-523347621.

(Continued)

*Primary Examiner* — Crystal L Hammond
(74) *Attorney, Agent, or Firm* — Myers Bigel, P.A.

(57) ABSTRACT

A lighting apparatus includes a solid-state lighting circuit, at least one ballast connection port and at least one low-frequency blocking impedance coupling the at least one ballast connection port to the solid-state lighting circuit. In some embodiments, the at least one low-frequency blocking impedance may be configured to block a DC offset. In further embodiments, the at least one low-frequency blocking impedance may be configured to block a nominally 60 Hz frequency component. The at least one ballast connection port may include a first ballast connection port and a second ballast connection port and the at least one low-frequency blocking impedance may include a first low-frequency blocking impedance coupling the first ballast connection port to a first terminal of the solid-state lighting circuit and a second low-frequency blocking impedance coupling the second ballast connection port to a second input terminal of the solid-state lighting circuit.

33 Claims, 12 Drawing Sheets

Related U.S. Application Data which is a continuation-in-part of application No. 13/749,082, filed on Jan. 24, 2013.

(60) Provisional application No. 61/840,697, filed on Jun. 28, 2013.

(56) References Cited

U.S. PATENT DOCUMENTS

| | | | |
|---|---|---|---|
| 4,392,089 A * | 7/1983 | Lester | H05B 41/392 307/116 |
| 4,506,195 A * | 3/1985 | Elms | H05B 41/2887 315/205 |
| 4,540,917 A | 9/1985 | Luchaco et al. | |
| 4,560,908 A * | 12/1985 | Stupp | H05B 41/28 315/219 |
| 4,682,147 A | 7/1987 | Bowman | |
| 5,404,082 A * | 4/1995 | Hernandez | H02M 1/4241 315/219 |
| 5,408,403 A | 4/1995 | Nerone et al. | |
| 5,416,387 A | 5/1995 | Cuk et al. | |
| 5,466,992 A | 11/1995 | Nemirow et al. | |
| 5,488,269 A | 1/1996 | El-Hamamsy et al. | |
| 5,598,326 A | 1/1997 | Liu et al. | |
| 5,734,230 A | 3/1998 | Edwards et al. | |
| 5,895,986 A * | 4/1999 | Walters | H05B 37/0218 250/214 AL |
| 5,925,990 A | 7/1999 | Crouse et al. | |
| 6,051,938 A * | 4/2000 | Arts | H05B 41/3927 315/200 R |
| 6,069,453 A * | 5/2000 | Arts | H05B 41/2858 315/209 R |
| 6,124,678 A * | 9/2000 | Bishop | H05B 41/2822 315/209 PZ |
| 6,333,605 B1 | 12/2001 | Grouev et al. | |
| 6,362,575 B1 * | 3/2002 | Chang | H05B 41/2827 315/209 R |
| 6,411,045 B1 | 6/2002 | Nerone | |
| 6,507,157 B1 | 1/2003 | Erhardt et al. | |
| 6,509,657 B1 | 1/2003 | Wong et al. | |
| 6,822,426 B1 | 11/2004 | Todd et al. | |
| 6,936,968 B2 | 8/2005 | Cross et al. | |
| 7,027,010 B2 | 4/2006 | Lee | |
| 7,067,992 B2 | 6/2006 | Leong | |
| 7,138,994 B2 | 11/2006 | Cho et al. | |
| 7,456,588 B2 * | 11/2008 | Alexandrov | H05B 37/0263 315/288 |
| 7,507,001 B2 | 3/2009 | Kit | |
| 7,511,971 B2 | 3/2009 | Lim | |
| 7,863,828 B2 * | 1/2011 | Melanson | H02M 1/4225 315/247 |
| 7,863,832 B2 * | 1/2011 | Lane | H02J 9/065 315/291 |
| 7,911,149 B2 | 3/2011 | Schaible et al. | |
| 8,089,213 B2 | 1/2012 | Park | |
| 8,310,172 B2 | 11/2012 | Negrete | |
| 8,322,878 B2 | 12/2012 | Hsia | |
| 8,358,056 B2 | 1/2013 | Park | |
| 8,461,794 B2 | 6/2013 | Schrod et al. | |
| 9,237,625 B1 * | 1/2016 | Mays, II | H05B 33/0854 |
| 9,357,599 B2 * | 5/2016 | Tomiyama | H05B 33/0818 |
| 2003/0057888 A1 | 3/2003 | Archenhold et al. | |
| 2003/0117084 A1 * | 6/2003 | Stack | H05B 41/2853 315/224 |
| 2005/0029966 A1 | 2/2005 | Buonocunto | |
| 2005/0162101 A1 | 7/2005 | Leong et al. | |
| 2005/0200308 A1 * | 9/2005 | Rimmer | H05B 41/245 315/291 |
| 2007/0138972 A1 | 6/2007 | Siessegger | |
| 2007/0152604 A1 | 7/2007 | Tatsumi | |
| 2007/0182338 A1 | 8/2007 | Shteynberg | |
| 2007/0273290 A1 | 11/2007 | Ashdown et al. | |
| 2008/0055077 A1 | 3/2008 | Lane et al. | |
| 2008/0266849 A1 | 10/2008 | Nielson et al. | |
| 2009/0033239 A1 | 2/2009 | Gwisdalla et al. | |
| 2009/0128057 A1 * | 5/2009 | Valdez | H05B 41/2825 315/307 |
| 2010/0079091 A1 | 4/2010 | Deixler et al. | |
| 2010/0096976 A1 * | 4/2010 | Park | H05B 33/0803 313/498 |
| 2010/0109560 A1 | 5/2010 | Yu et al. | |
| 2010/0135000 A1 | 6/2010 | Smith, III et al. | |
| 2010/0194296 A1 | 8/2010 | Park | |
| 2010/0237840 A1 | 9/2010 | Walter et al. | |
| 2010/0244981 A1 | 9/2010 | Gorbachov | |
| 2010/0259239 A1 | 10/2010 | Shi et al. | |
| 2010/0270941 A1 * | 10/2010 | Hui | H05B 33/0809 315/291 |
| 2010/0277070 A1 | 11/2010 | Butteris et al. | |
| 2011/0006691 A1 | 1/2011 | Blaha et al. | |
| 2011/0043035 A1 | 2/2011 | Yamada et al. | |
| 2011/0043127 A1 | 2/2011 | Yamasaki | |
| 2011/0043136 A1 | 2/2011 | Radermacher | |
| 2011/0057572 A1 * | 3/2011 | Kit | H05B 33/0809 315/185 R |
| 2011/0080116 A1 | 4/2011 | Negley et al. | |
| 2011/0109164 A1 * | 5/2011 | Mohammed Suhura | H02J 9/065 307/66 |
| 2011/0121754 A1 | 5/2011 | Shteynberg et al. | |
| 2011/0121756 A1 | 5/2011 | Thomas | |
| 2011/0140611 A1 | 6/2011 | Elek et al. | |
| 2011/0140612 A1 | 6/2011 | Mohan et al. | |
| 2011/0254461 A1 | 10/2011 | Summerland et al. | |
| 2011/0291582 A1 | 12/2011 | Wei et al. | |
| 2012/0008315 A1 * | 1/2012 | Simon | F21V 21/005 362/217.13 |
| 2012/0153854 A1 | 6/2012 | Setomoto et al. | |
| 2012/0161666 A1 | 6/2012 | Antony | |
| 2012/0242241 A1 | 9/2012 | Schmacht | |
| 2012/0274237 A1 * | 11/2012 | Chung | F21V 23/02 315/297 |
| 2012/0286668 A1 | 11/2012 | Kondo et al. | |
| 2012/0306403 A1 * | 12/2012 | Chung | H05B 33/0818 315/291 |
| 2012/0313520 A1 | 12/2012 | Canter et al. | |
| 2013/0020951 A1 | 1/2013 | Pollock et al. | |
| 2013/0043803 A1 | 2/2013 | Raj | |
| 2013/0049613 A1 | 2/2013 | Reed | |
| 2013/0063027 A1 | 3/2013 | Recker et al. | |
| 2013/0214697 A1 | 8/2013 | Archenhold | |
| 2014/0203714 A1 * | 7/2014 | Zhang | H05B 33/0809 315/185 R |

FOREIGN PATENT DOCUMENTS

| | | |
|---|---|---|
| CN | 102155644 A | 8/2011 |
| CN | 102278722 B | 11/2013 |
| EP | 2 178 345 A2 | 4/2010 |
| EP | 2 288 237 A2 | 2/2011 |
| EP | 2 432 297 A2 | 3/2012 |
| WO | WO 95/22194 | 8/1995 |
| WO | WO 2009/010802 A2 | 1/2009 |
| WO | WO 2009/136322 A1 | 11/2009 |
| WO | WO 2010/127366 A2 | 11/2010 |
| WO | WO 2011/124721 A1 | 10/2011 |
| WO | 20131324827 A1 | 2/2012 |
| WO | WO 2012/104800 A2 | 8/2012 |
| WO | WO 2012/110973 A1 | 8/2012 |
| WO | 2013124827 | 8/2013 |
| WO | 2014115010 A1 | 7/2014 |
| WO | WO 2014/115010 A1 | 7/2014 |

OTHER PUBLICATIONS

Vitanza A. et al., Electronic Fluorescent Lamp Ballast, pp. 1-10, 1999, STMicroelectronics Application Note AN427/1294, http://www.st.com/static/acdtive/cn/resource/technical/document/application_note/CD00003901.pdf.

Capacitor-Input filter, Dec. 4, 2012, http://en.wikipedia.org/w/index.php?title=Capacitor-input_filter&oldid=526350197.

(56) References Cited

OTHER PUBLICATIONS

Third Party Submission Filed on May 20, 2015 Corresponding to U.S. Appl. No. 13/749,082, 14 pages.
Third Party Submission Filed on Jun. 9, 2015 Corresponding to U.S. Appl. No. 13/749,082, 27 pages.
Third Party Submission Filed on Apr. 21, 2015 Corresponding to U.S. Appl. No. 13/943,455, 26 pages.
Third Party Submission Filed on Apr. 16, 2015 Corresponding to U.S. Appl. No. 13/943,455, 26 pages.
Third Party Submission Filed on Apr. 20, 2015 Corresponding to U.S. Appl. No. 13/943,455, 13 pages.
International Preliminary Report on Patentability corresponding to International Patent Application No. PCT/US2013/068905 (11 pages) (dated Jul. 28, 2015).
International Preliminary Report on Patentability Corresponding to International Application No. PCT/US2013/068904; dated Aug. 6, 2015; 8 Pages.
International Search Report and Written Opinion Corresponding to International Application No. PCT/US2014/060594; dated Jan. 16, 2015; 9 Pages.
Chen N. et al., "A Driving Technology for Retrofit LED Lamp for Fluorescent Lighting Fixtures With Electronic Ballasts", *IEEE Transactions on Power Electronics*, vol. 26, No. 2, Feb. 2011, 588-601.
International Search Report and Written Opinion Corresponding to International Application No. PCT/US12/68987; dated Feb. 26, 2013; 14 Pages.
International Search Report Corresponding to International Application No. PCT/US2012/069126; dated Feb. 20, 2013; 17 Pages.
International Search Report Corresponding to International Application No. PCT/US12/68991; dated Mar. 4, 2013; 10 Pages.
Invitation to Pay Additional Fees Corresponding to International Application No. PCT/US12/68984; dated Feb. 1, 2013; 2 Pages.
Johnson B., "Controlling power and cost for multiple LEDs", *EE Times*, Nov. 5, 2006, Retrieved on Feb. 6, 2013 from URL, http://eetimes.com/design/power-management-design/4012121/Controlling-power-and-cost-for-multiple-LEDs?pageNumber.
Notification of Transmittal of the International Search Report and the Written Opinion of the International Searching Authority, or the Declaration, PCT/US13/68904, dated Mar. 19, 2014, 9 pages.
Notification of Transmittal of the International Search Report and the Written Opinion of the International Searching Authority, or the Declaration, PCT/US13/68910, dated Apr. 4, 2014, 13 pages.
Notification of Transmittal of the International Search Report and the Written Opinion of the International Searching Authority, or the Declaration, PCT/US13/68905, dated Apr. 7, 2014, 12 pages.
Notification of Transmittal of the International Search Report and the Written Opinion of the International Searching Authority, or the Declaration, PCT/US12/68984, dated May 10, 2013.
Ribarich; *Driver—Off-Line LED Control Circuit*; LED Professional Review; Jan./Feb. 2009; pp. 21-24.
European Search Report Corresponding to European Patent Application No. 13 87 3105; Dated: Jul. 12, 2016; 7 Pages.
Chinese First Office Action Corresponding to Application No. 201380071192.9; dated Jun. 27, 2016; Foreign Text, 14 Pages, English Translation Thereof, 9 Pages.
European Search Report Corresponding to Application No. 13 87 2794; Dated: Oct. 18, 2016; 8 Pages.
Second Office Action issued in corresponding Chinese Application No. 201380071192.9, dated May 12, 2017, including English translation.
Chan, Design of Differential Filters for High-Speed Signal Chains, Application Report SLWAOSSB. Apr. 2010, http://www.ti.com/lit/an/slwa053b/slwa053b.pdf.
The Inductor, p. 3, Nov. 20, 2012, http://www.talkingelectronics.com/projects/lnductor/lnductor-3.html.
Impedance Matching, Nov. 16, 2012, http://en.wikipedia.org/w/index.php?title=Impedance_matching&oldid=523347621.
Horowitz et al., The Art of Electronics, p. 32, 1989, Cambridge University Press, Cambridge.
Zhang et al, A Capacitor-Isolated LED Driver with Inherent Current Balance Capability, pp. 1708-1716, Apr. 2012, IEE Trans. Indust. Electronics vol. 59.
Pyakuryal et al, Filter Design for AC to DC Converter, pp. 42-49, Jun. 22, 2013, IRJES, http://www.irjes.com/Papers/vol2-issue6/Version-1/E02064249.pdf, vol. 2:6.
Lee, Robust Passive LED Driver Compatible with Conventional Rapid-Start Ballast, pp. 3694-3706, Dec. 2011, IEEE Trans. on Power Electronics, vol. 26:1 2.
Chen, A Driving Technology for Retrofit LED Lamp for Fluorescent Lighting Fixtures with Electronic Ballasts, pp. 588-601, IEEE Trans. on Power Electronics, vol. 26:2.
AC Film Capacitors in Connection with the Mains, Jan. 7, 2009, pp. 301-303, Vishay Intertechnology, Inc., http://www.eettaiwan.com/STATIC/PDF/200903/20090304_Vishay_AN02.pdf?SOURCES=DOWNLOAD.
Malvino et al, 2008, Basic Electronics (MSBTE), 3-12 Series Inductor Filter, pp. 94-95, Tata McGraw-Hill Company Limited.
Vishay Intergechnology, AC Film Capacitors in Connection with the Mains, pp. 301-303, Jan. 7, 2009, Vishay Intertechnology, http://www.eettaiwan.com/STATIC/ PDF/20090S/20090304_Vishay__AN02.pdf?Sources=DOWNLOAD.
Zhu et al, Novel Capacitor-Isolated Power Convener, pp. 1824-1829, Sep. 2010, Energy Conversion Congress and Exposition (ECCE), 2010 IEEE held in Atlanta, GA.
Capacitor-Input Filter, Dec. 12, 2011, http://en.wikipedia.org/w/index.php?title=Capacitor-input_filter?oldid=465397872.

\* cited by examiner

SOLID-STATE LIGHTING APPARATUS FOR USE WITH FLUORESCENT BALLASTS

CROSS REFERENCE TO RELATED APPLICATIONS

The present application is a continuation-in-part application and claims the benefit of U.S. patent application Ser. No. 14/055,264, filed Oct. 16, 2013 entitled SOLID-STATE LIGHTING APPARATUS WITH FILAMENT IMITATION FOR USE WITH FLORESCENT BALLASTS which is a continuation-in-part application and claims the benefit of U.S. patent application Ser. No. 13/943,455, filed Jul. 16, 2013 entitled LED LIGHTING APPARATUS FOR USE WITH AC-OUTPUT LIGHTING BALLASTS, claiming the benefit of U.S. Provisional Patent Application No. 61/840,697, filed Jun. 28, 2013 entitled LED LIGHTING APPARATUS FOR USE WITH AC-OUTPUT LIGHTING BALLASTS, and which is also a continuation-in-part application and claims the benefit of U.S. patent application Ser. No. 13/749,082, filed Jan. 24, 2013 entitled LED LIGHTING APPARATUS FOR USE WITH AC-OUTPUT LIGHTING BALLASTS, the disclosures of all the aforementioned applications are hereby incorporated herein by reference in their entirety.

BACKGROUND

The present inventive subject matter relates to lighting apparatus and methods and, more particularly, to solid-state lighting apparatus.

Solid-state lighting arrays are used for a number of lighting applications. A solid-state light-emitting device may include, for example, a packaged light emitting device including one or more light emitting diodes (LEDs). These may include inorganic LEDs, which may include semiconductor layers forming p-n junctions, and/or organic LEDs (OLEDs), which may include organic light emission layers.

Solid-state lighting devices are commonly used in lighting fixtures, including task lighting, recessed light fixtures, ceiling mounted troffers and the like. Solid-state lighting panels are also commonly used as backlights for small liquid crystal display (LCD) screens, such as LCD display screens used in portable electronic devices, and for larger displays, such as LCD television displays.

Solid-state lighting devices may be attractive for retrofit/replacement applications, where devices such as LEDs may offer improved energy efficiency, reduced heat generation, extended life and desired performance characteristics, such as certain color and/or color rendering capabilities. For example, LED bulbs are commonly used to replace incandescent bulbs in down lights and other applications to reduce energy consumption and increase time between replacements. LED-based replacements for fluorescent lamps have also been developed, as shown, for example, in U.S. Pat. Nos. 6,936,968, 7,507,001, 8,089,213, 8,358,056 and U.S. Patent Application Publication No. 2008/0266849, which describe various types of LED replacements for use in fluorescent light fixtures.

SUMMARY

Some embodiments provide a lighting apparatus including a solid-state lighting circuit and first and second ballast connection ports configured to be coupled to a ballast. A first filament-imitating impedance is coupled to the first ballast connection port and a first low-frequency blocking impedance couples the first filament-imitating impedance to a first input terminal of the solid-state lighting circuit. A second filament-imitating impedance is coupled to the second ballast connection port and a second low-frequency blocking impedance couples the second filament-imitating impedance to a second input terminal of the solid-state lighting circuit. A fluorescent replacement lamp may include such an apparatus, wherein the first and second terminals of the first and second ballast connection ports comprise respective pins configured to be connected to a fluorescent lamp connector.

In some embodiments, the first and second filament-imitating impedances each comprise at least one capacitor. The first and second filament-imitating impedances may be configured to transfer power at a nominal frequency of an output produced by the ballast and to provide impedances at the first and second ballast connection ports that prevent shutdown of the ballast. In some embodiments, capacitances provided at the respective first and second ballast connection ports may be in a range from about 0.1 µF to about 4 µF. Each of the first and second filament-imitating impedances may further include at least one resistor coupled in parallel with the at least one capacitor thereof.

According to some embodiments, each of the first and second low-frequency blocking impedances may be configured to block a DC offset, In further embodiments, each of the first and second low-frequency blocking impedances may be configured to block a nominally 60 Hz frequency component. Each of the first and second low-frequency blocking impedances may include at least one capacitor. The apparatus may further include respective resistors coupled in parallel with the at least one capacitors of the first and second low-frequency blocking impedances.

In some embodiments, the solid-state lighting circuit may include a rectifier circuit having an input port coupled to the first and second low-frequency blocking impedances and at least one light emitting diode (LED) coupled to an output port of the rectifier circuit. The solid-state lighting circuit may further include a matching circuit. The matching circuit may include at least one capacitor coupled in parallel with the output port of the rectifier circuit and at least one inductor coupled between the at least one capacitor and the at least one LED. The at least one LED may include at least one LED string.

Further embodiments provide a lighting apparatus including a solid-state lighting circuit, at least one ballast connection port and at least one low-frequency blocking impedance coupling the at least one ballast connection port to the solid-state lighting circuit. In some embodiments, the at least one low-frequency blocking impedance may be configured to block a DC offset. In further embodiments, the at least one low-frequency blocking impedance may be configured to block a nominally 60 Hz frequency component.

The at least one low-frequency blocking impedance may include at least one capacitor. The apparatus may further include at least one resistor coupled in parallel with the at least one capacitor.

The apparatus may further include a filament-imitating impedance coupling the at least one ballast connection port to the at least one low-frequency blocking circuit.

The solid-state lighting circuit may include a rectifier circuit having an input port coupled to the at least one low-frequency blocking impedance and at least one LED coupled to an output port of the rectifier circuit. The solid-state lighting circuit may further include a matching circuit. The matching circuit may include at least one capacitor coupled in parallel with the output port of the rectifier circuit and at least one inductor coupled between the at least one capacitor and the at least one LED.

In further embodiments, the at least one ballast connection port may include a first ballast connection port and a second ballast connection port and the at least one low-frequency blocking impedance may include a first low-frequency blocking impedance coupling the first ballast connection port to a first terminal of the solid-state lighting circuit and a second low-frequency blocking impedance coupling the second ballast connection port to a second input terminal of the solid-state lighting circuit. Each of the first and second low-frequency blocking impedances may be configured to block a DC offset. In some embodiments, each of the first and second low-frequency blocking impedances may be configured to block a nominally 60 Hz frequency component.

Each of the first and second low-frequency blocking impedances may include at least one capacitor. The apparatus may further include respective resistors coupled in parallel with the at least one capacitors of the first and second low-frequency blocking impedances.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter. In the drawings.

DETAILED DESCRIPTION

Figure 1:
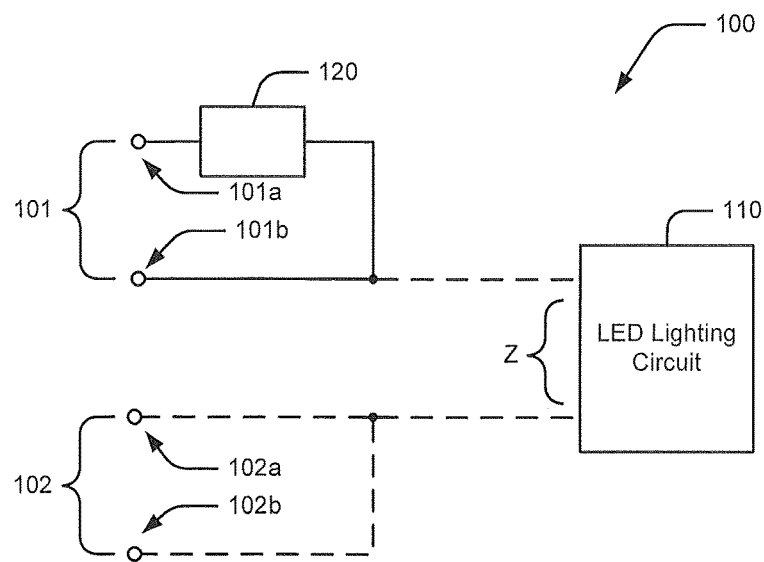
FIG. 1 is a schematic diagram illustrating lighting apparatus with a filament-imitating impedance according to some embodiments.

Embodiments of the present inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. When a third element "couples" first and second elements, additional intervening elements may be present between the third element and the respective first and second elements. It will be further understood that elements "coupled in series" or "serially connected" may be directly coupled or may be coupled via intervening elements.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

FIG. 1 illustrates a lighting apparatus 100 according to some embodiments. The apparatus includes at least one ballast connection port 101 including first and second terminals 101a, 101b. The terminals 101a, 101b may comprise, for example, pins that are configured to be connected to a fluorescent lamp connector (e.g., a tombstone connector) that provides electrical coupling to a fluorescent lighting ballast. The apparatus 100 may also include a second port 102 with similar terminals 102a, 102b for use in, for example, bi-pin fluorescent tube replacement applications.

A filament-imitating impedance 120 is coupled between the first and second terminals 101a, 101b. A solid-state lighting circuit, here shown as LED lighting circuit 110 (which may include one or more LEDs and associated circuitry for driving the same), is coupled to the filament-imitating impedance 120 and the second terminal 101b. The LED lighting circuit 110 may also be coupled to the terminals 102a, 102b of the second ballast connection port 102, either directly or via intervening circuitry.

According to some embodiments, the filament-imitating impedance 120 is configured to provide an impedance that mimics behavior of the filament of a fluorescent lamp. In particular, the filament-imitating impedance may be configured to present an impedance between the first and second terminals of a ballast connection port that mimics the impedance provided by a filament of a fluorescent lamp, while at the same time allowing power transfer between the ballast connection port 101 and the LED lighting circuit 110 so that the one or more LEDs of the LED lighting circuit 110 may be driven by the ballast. In particular, some fluorescent lighting ballasts may be configured to detect the state of an attached lamp by monitoring the AC and/or DC impedance between terminals of pins connected to the ends of the filament, and may shut down the ballast if the impedance indicates a failed/failing lamp. The filament-imitating impedance may mimic the impedance of a healthy filament under such monitoring and, therefore, may prevent unwanted shutdown. As further shown, the LED lighting circuit 110 may be configured to provide a matching impedance between the first and second ballast connection ports 101, 102 that facilitates power transfer between the ballast and the LED lighting circuit 110.

Figure 2:
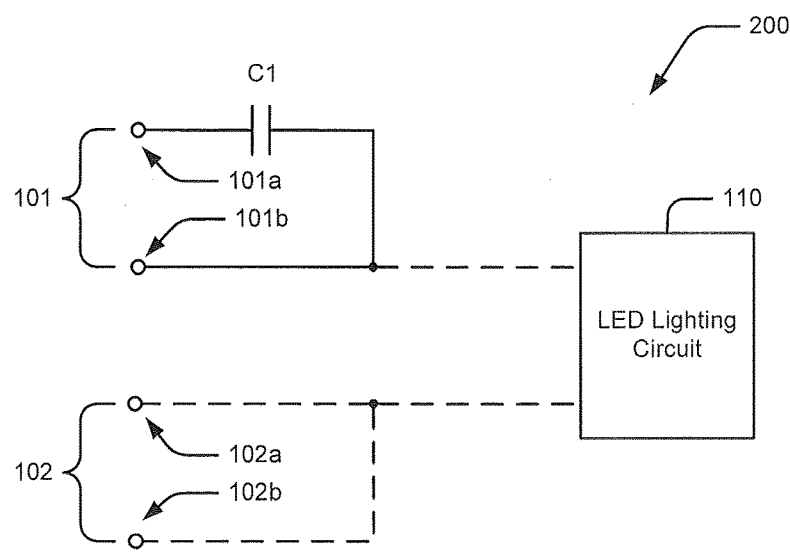
FIG. 2 is a schematic diagram illustrating lighting apparatus using a capacitor as a filament-imitating impedance according to some embodiments.

As shown in FIG. 2, a filament-imitating impedance may take the form of a capacitor C1 coupled to the first and second terminals 101a, 101b of the first ballast port 101 and to a LED lighting circuit 110. The capacitor C1 may be sized such that it presents a relatively low impedance above a certain frequency corresponding to the nominal output frequency of the ballast while still providing an impedance sufficient to imitate the filament impedance of a fluorescent lamp and, thus, prevent shutdown due to failure of a filament test by the ballast. In this manner, filament imitation may be provided while maintaining efficient power transfer to the LED lighting circuit 110 The LED lighting circuit 110 may present an impedance that approximately matches an output impedance of the ballast at the ballast's nominal frequency such that power transfer to the LED lighting circuit 110 may be optimized. According to some embodiments, the capacitor C1 may provide a capacitance between the first and second terminals 101a, 101b of the ballast connection port 101 that is in a range from about 0.1 µF to about 4 µF.

Figure 3:
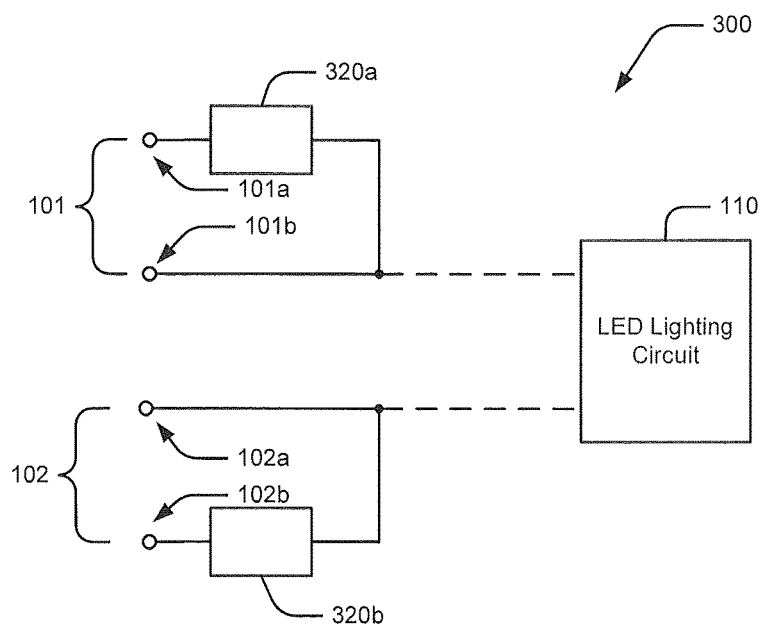
FIGS. 3-6 are schematic diagrams illustrating lighting apparatus with various filament-imitating impedance configurations according to some embodiments.
Figure 4:
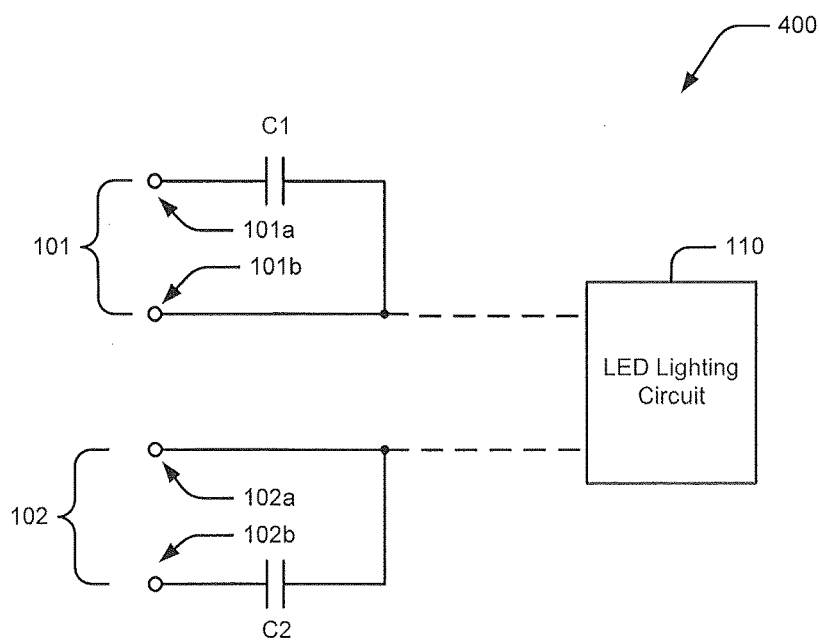
Figure 5:
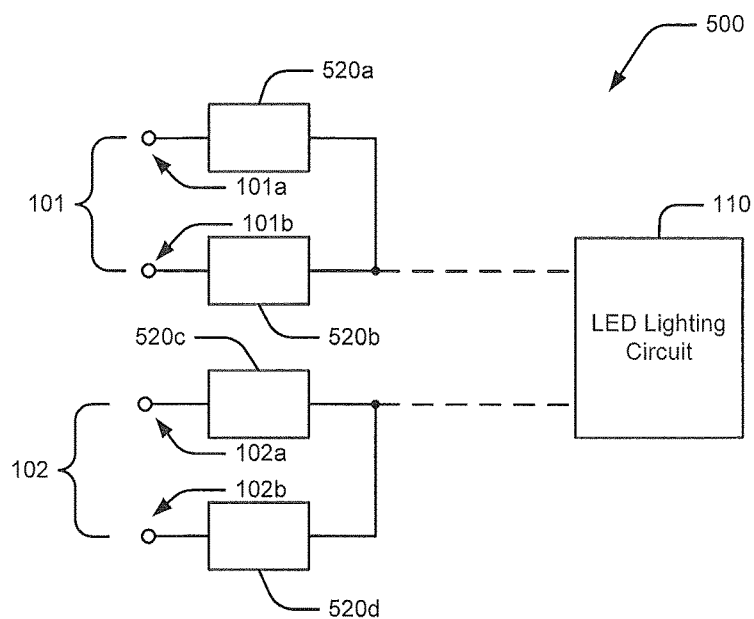
Figure 6:
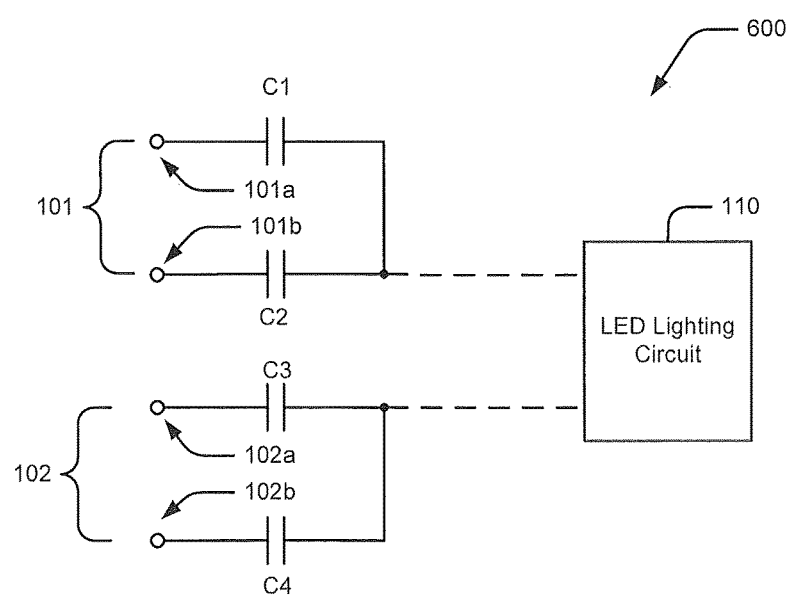

Various embodiments may provide differing arrangements of filament-imitating impedances. For example, FIG. 3 illustrates a lighting apparatus 300 including a first filament-imitating impedance 320a coupled between a first and second terminals 101a, 101b of a first ballast connection port 101 and a second filament-imitating impedance coupled between first and second terminals 102a, 102b of a second ballast connection port 102. As shown in FIG. 4, a lighting apparatus 400 may use such an arrangement implemented using first and second capacitors C1, C2. As shown in FIG. 5, a lighting apparatus 500 may include respective filament-imitating impedances 520a, 520b, 520c, 520d coupled to respective terminals 101a, 101b, 102a, 102b of first and second ballast connection ports 101, 102. As shown in FIG. 6, such an arrangement may be implemented using respective capacitors C1, C2, C3, C4. Along the lines discussed above, these arrangements may provide capacitances between the first and second terminals 101a, 101b of the first ballast connection port 101 and between the first and second terminals 102a, 102b of the second ballast connection port 102 that are in a range from about 0.1 µF to about 4 µF. The LED lighting circuit 110 may provide a matching impedance between the first and second ballast connection ports 101, 102 as described above.

Figure 7:
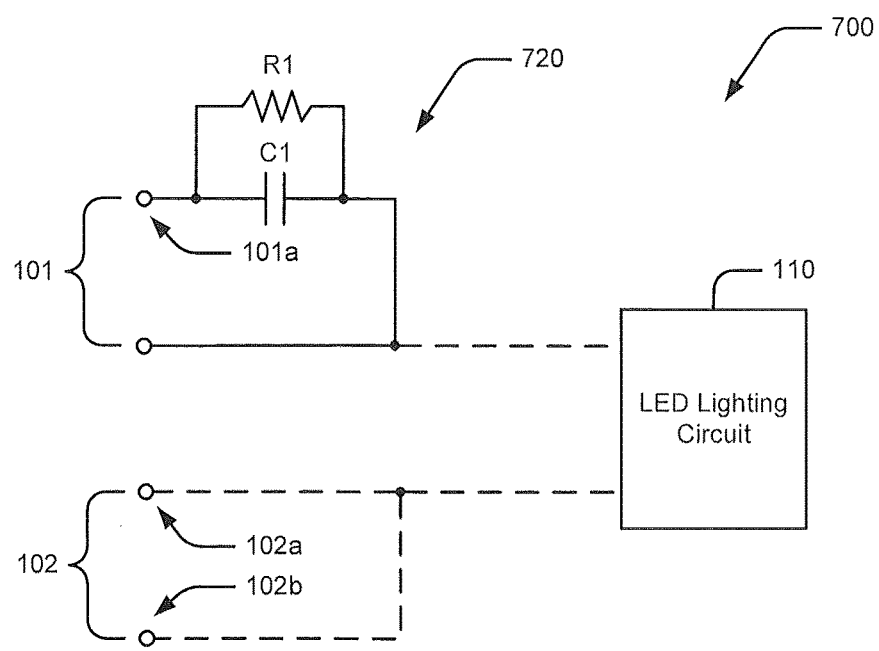
FIG. 7 is a schematic diagram illustrating lighting apparatus with a filament-imitating impedance including a parallel combination of a capacitor and resistance according to some embodiments.

According to further embodiments illustrated in FIG. 7, a lighting apparatus 700 may include a filament-imitating impedance 720 that includes a capacitor C1 and a resistor R1 connected in parallel with the capacitor C1. Some fluorescent lamp ballasts are configured to detect a DC resistance between pins connected to ends of a filament, and may prevent operation of the lamp if the DC resistance is too great. The resistor R1 may provide sufficient continuity between the terminals 101a, 101b to prevent such a shutdown. According to further embodiments, the resistor R1 may have a resistance operative to limit current through an attached starter circuit (not shown) to inhibit starter operation, i.e., the resistor R1 may provide a resistance sufficient to reduce or prevent glow discharge in the starter such that a bimetallic switch in the starter remains open. Appropriate resistor values for T8 replacement applications, for example, may be in a range from about 1 k ohms to about 50 k ohms.

Figure 8:
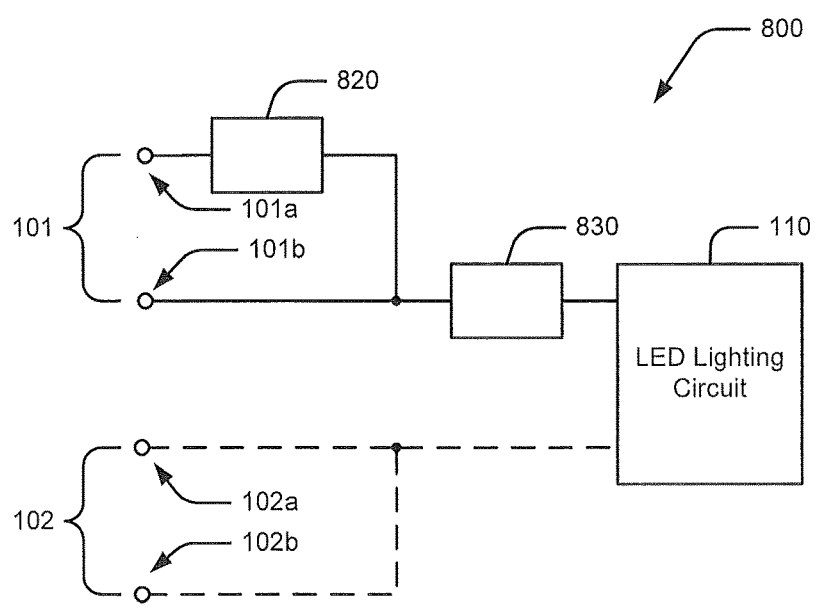
FIGS. 8-10 are schematic diagrams illustrating lighting apparatus with a filament-imitating impedance and blocking impedance according to various embodiments.

FIG. 8 illustrates a lighting apparatus 800 according to some embodiments of the inventive subject matter. A filament-imitating impedance 820 is coupled to a first terminal 101a of a first ballast connection port 101. A low-frequency blocking impedance 830 is coupled between the second terminal 101b of the first port 101 and an LED lighting circuit 110. The filament-imitating impedance 820 is configured to present an impedance to the ballast that has characteristics similar to those provided by a filament of a fluorescent lamp and may take the form, for example, of the filament-imitating impedances described above with reference to FIGS. 1-7. The blocking impedance 830 is configured to blocks a lower frequency component that may be provided by the ballast, such as a DC offset produced by the ballast. In some embodiments, the apparatus 800 may be configured for operation only with high-frequency electronic ballasts, and the blocking impedance 830 may be configured to block a 60 Hz component so that, if the apparatus 800 is incorrectly connected to a magnetic ballast, transfer of power to the LED lighting circuit 110 may be reduced or prevented, thus preventing damage and/or improper operation.

Figure 9:
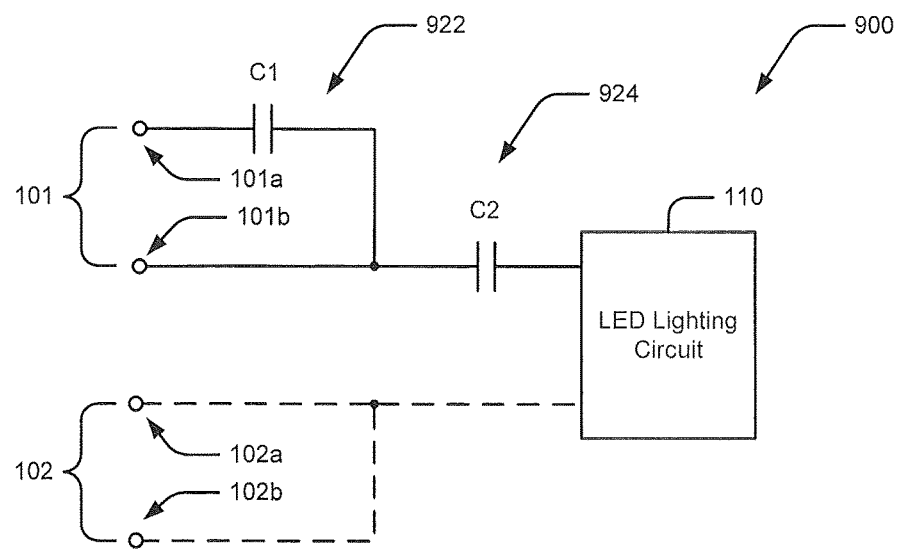

In some fluorescent replacement lamp applications, the arrangement of the filament-imitating impedance 820 and the blocking impedance 830 may facilitate installation without concern about the orientation of the lamp with respect to the lamp connectors. A typical fluorescent tube is symmetrical, i.e., the two pins on the end of the tube are interchangeable in function. In some fixtures, one of the pins will be connected to the ballast, while the other of the pins will be connected to a starter circuit. Installation of a replacement lamp along the lines of FIG. 8 in such a fixture may result in the first terminal 101a being connected to the ballast and the second terminal 101b being connected to the starter, such that the filament-imitating impedance 820 may also provide a low-frequency blocking function. However, if the pins 101a, 101b are reversed, the ballast may be connected to the second terminal 101b rather than the first terminal 101a. In this arrangement, the filament-imitating impedance 820 would still provide filament imitation, but would not provide the desired low frequency blocking. Such blocking would be provided by the blocking impedance 830. FIG. 9 illustrates an exemplary lighting apparatus 900, in which filament-imitating and blocking impedances are provided by respective capacitors C1, C2.

Figure 10:
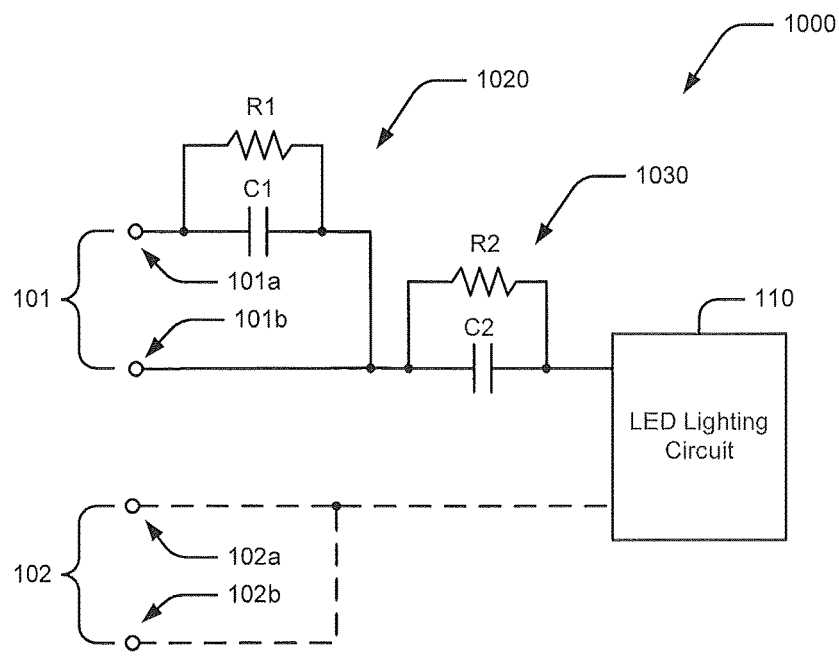

According to further embodiments illustrated in FIG. 10, a lighting apparatus 1000 may include a filament-imitating impedance 1020 including a capacitor C1 and a low-frequency blocking impedance 1030 including a capacitor C2 as described above. The filament-imitating impedance 1020 may also include a resistor R1 coupled in parallel with the capacitor C1. Some fluorescent lamp ballasts are configured to detect a DC resistance between pins connected to ends of a filament, and may prevent operation of the lamp if the DC resistance is too great. The resistor R1 may provide sufficient continuity between the terminals 101a, 101b to prevent such a shutdown. According to further embodiments, the resistor R1 may be sized to limit current through an attached starter circuit (not shown in FIG. 2) to inhibit starter operation as described above. As also shown in FIG. 10, an additional resistor R2 may be connected in parallel with the blocking capacitor C2. The resistor R2 may be configured to discharge a DC voltage that may develop across the blocking capacitor C2 when the apparatus is used with certain types of electronic ballasts.

Figure 11:
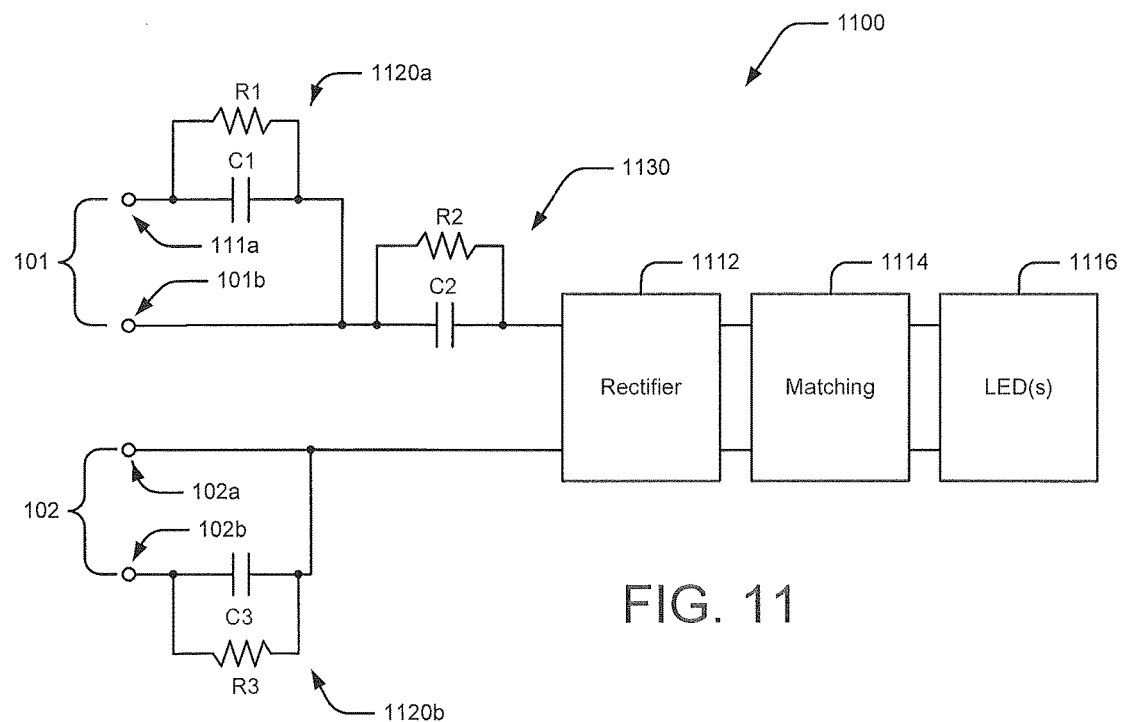
FIG. 11 is a schematic diagram illustrating lighting apparatus with a rectifier circuit and matching circuit according to some embodiments.

FIG. 11 illustrates a lighting apparatus 1100 according to further embodiments. The apparatus 1100 includes a first filament-imitating impedance 1120a that includes a resistor R1 and a capacitor C1 as described above coupled to a first ballast connection port 101, and a similar second filament-imitating impedance 1120b including a resistor R3 and capacitor C3 coupled to a second ballast connection port 102. A blocking capacitor C2 and associated resistor R2 couples the first filament-imitating impedance 1120a to an input port of a rectifier circuit 1112. A resonant matching circuit 1114 may couple an output port of the rectifier circuit 1112 to one or more LED(s) 1116. The resonant matching circuit 1114 may be configured to provide an impedance between the connection ports 101, 102 that enables an optimal or near optimal power transfer to the one or more LED(s) 1116.

Figure 12:
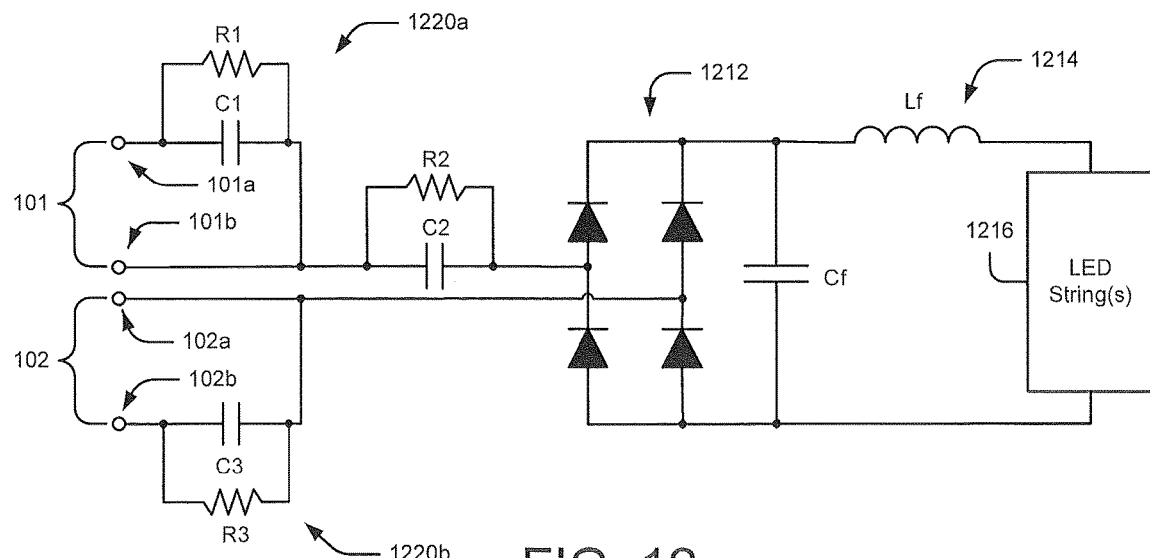
FIG. 12 is a schematic diagram illustrating lighting apparatus with a CL resonant matching circuit according to some embodiments.

As shown in FIG. 12, the rectifier circuit may comprise a diode bridge circuit 1212, the matching circuit may comprise a CL resonant circuit 1214 including a capacitor Cf and inductor Lf, and the one or more LED(s) may comprise one or more LED strings 1216. According to further embodiments illustrated in FIG. 13, a lighting apparatus may include filament-imitating impedances 1320a, 1320b, 1320c, 1320d in the form of parallel combinations of capacitors C1, C2, C3, C4 and resistors R1, R2, R3, R4 coupled between respective ones of the terminals 101a, 101b, 102a, 102b of first and second connection ports 101, 102 and a rectifier circuit 1212. This arrangement may eliminate the need for a separate blocking impedance.

Figure 13:
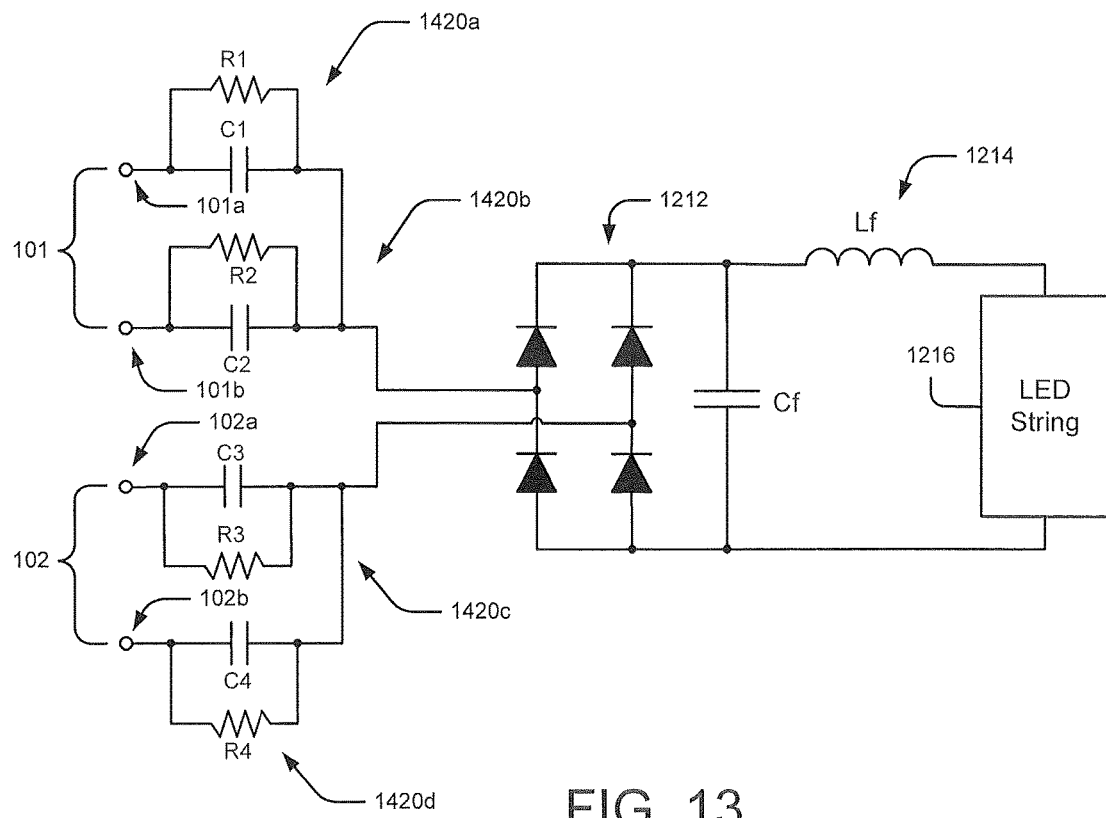
FIG. 13 is a schematic diagram illustrating lighting apparatus with a CL resonant matching circuit according to further embodiments.

It will be appreciated that the arrangements illustrated in FIGS. 11-13 are provided for purposes of illustration, and that any of a variety of other solid-state lighting circuits may be used in embodiments of the inventive subject matter. For example, some embodiments of the inventive subject matter may use filament-imitating impedances in combination with a variety of different solid-state lighting circuits described in a copending U.S. patent application Ser. No. 13/749,082 entitled "LED LIGHTING APPARATUS FOR USE WITH AC-OUTPUT LIGHTING BALLASTS", filed Jan. 24,2013 and in copending U.S. patent application Ser. No. 13/943,455 entitled "LED LIGHTING APPARATUS FOR USE WITH AC-OUTPUT LIGHTING BALLASTS", filed Jan. 24,2013, the disclosures of which are incorporated herein by reference in their entirety.

Figure 14:
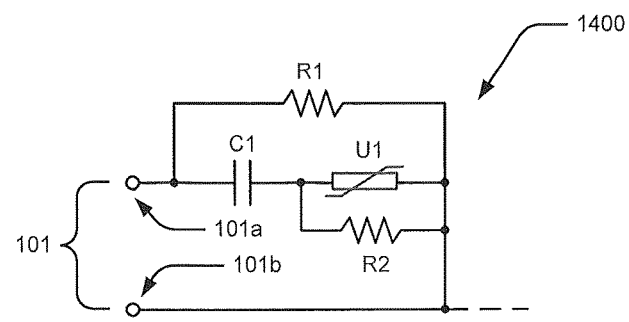
FIG. 14 is a schematic diagram illustrating a temperature-varying filament-imitating impedance according to some embodiments.

According to further embodiments, a filament-imitating impedance may be a temperature-varying impedance. Some ballasts perform filament tests in which a filament is tested by measuring a "cold" impedance of the filament before energizing, and then testing the filament impedance after the filament has been energized and heated up. If the change in impedance between the two temperatures fails to meet a predetermined criteria, the ballast may prevent operation. FIG. 14 illustrates a filament-imitating impedance 1400 including a capacitor C1 and resistor R1 along the lines described above, along with a parallel combination of an additional resistor R2 and a positive temperature coefficient (PTC) resistor U1 coupled in series with the capacitor C1. The PTC resistor U1 has a resistance that increases as current flows through the PTC resistor U1 and heats it up. Such an arrangement can be used to accommodate such a test and prevent shutdown due to failing the test.

Figure 15:
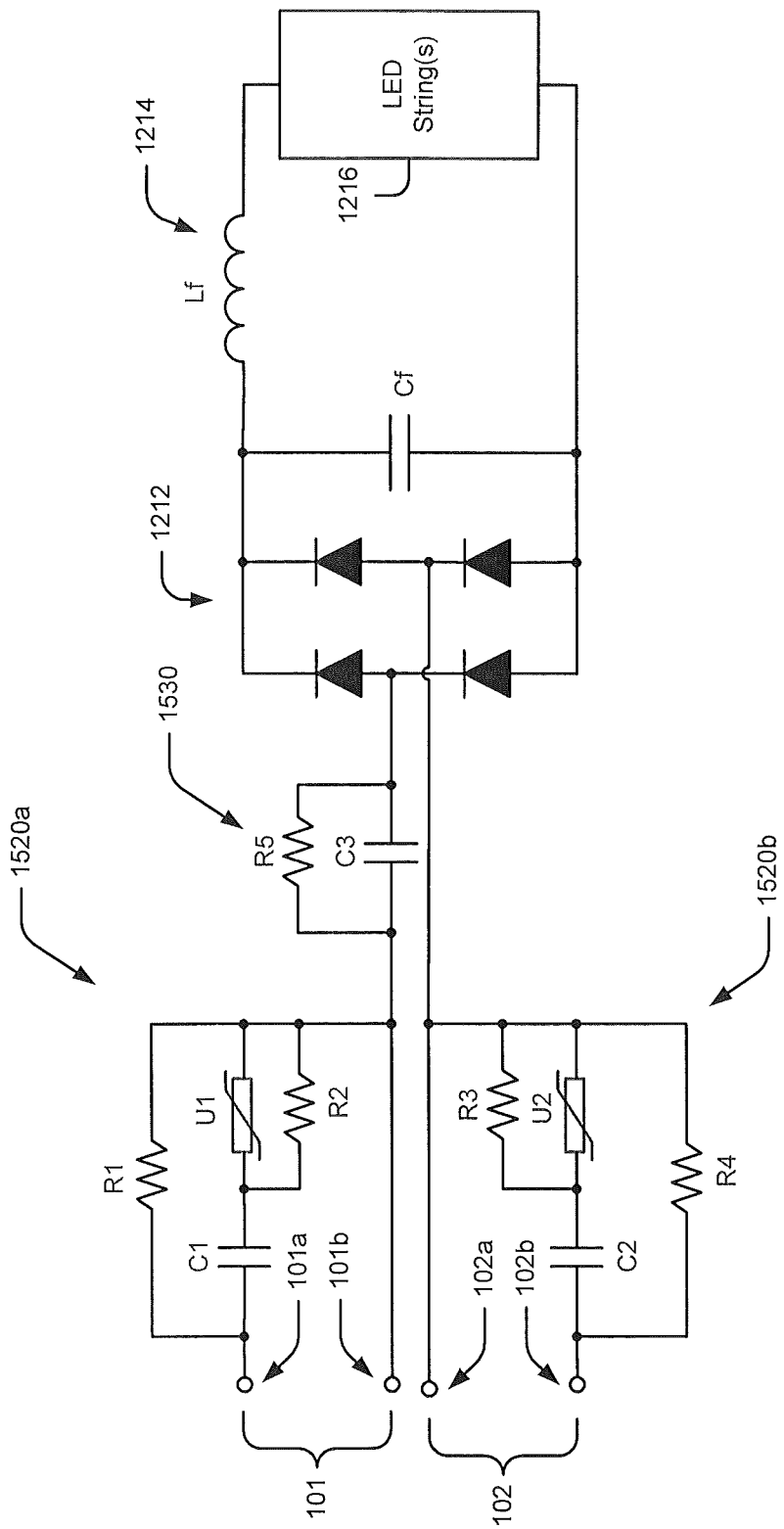
FIGS. 15 and 16 are schematic diagrams illustrating lighting apparatus using temperature-varying filament-imitating impedances according to some embodiments.

FIG. 15 illustrates use of such a filament-imitating impedance in a lighting apparatus 1500 that includes a rectifier circuit 1211, matching circuit 1214 and LED string(s) 1216 along the lines discussed above with reference to FIG. 12. A first filament-imitating impedance 1520a includes a capacitor C1, resistors R1, R2 and a PTC resistor U1, and is coupled to a first terminal of an input port of the rectifier circuit 1212 by a blocking circuit 1530 including a capacitor C1 and a resistor R5. A second filament-imitating impedance 1520b includes a capacitor C2, resistors R3, R4 and a PTC resistor U2 and is coupled to a second terminal of the input port of the rectifier circuit 1212.

Figure 16:
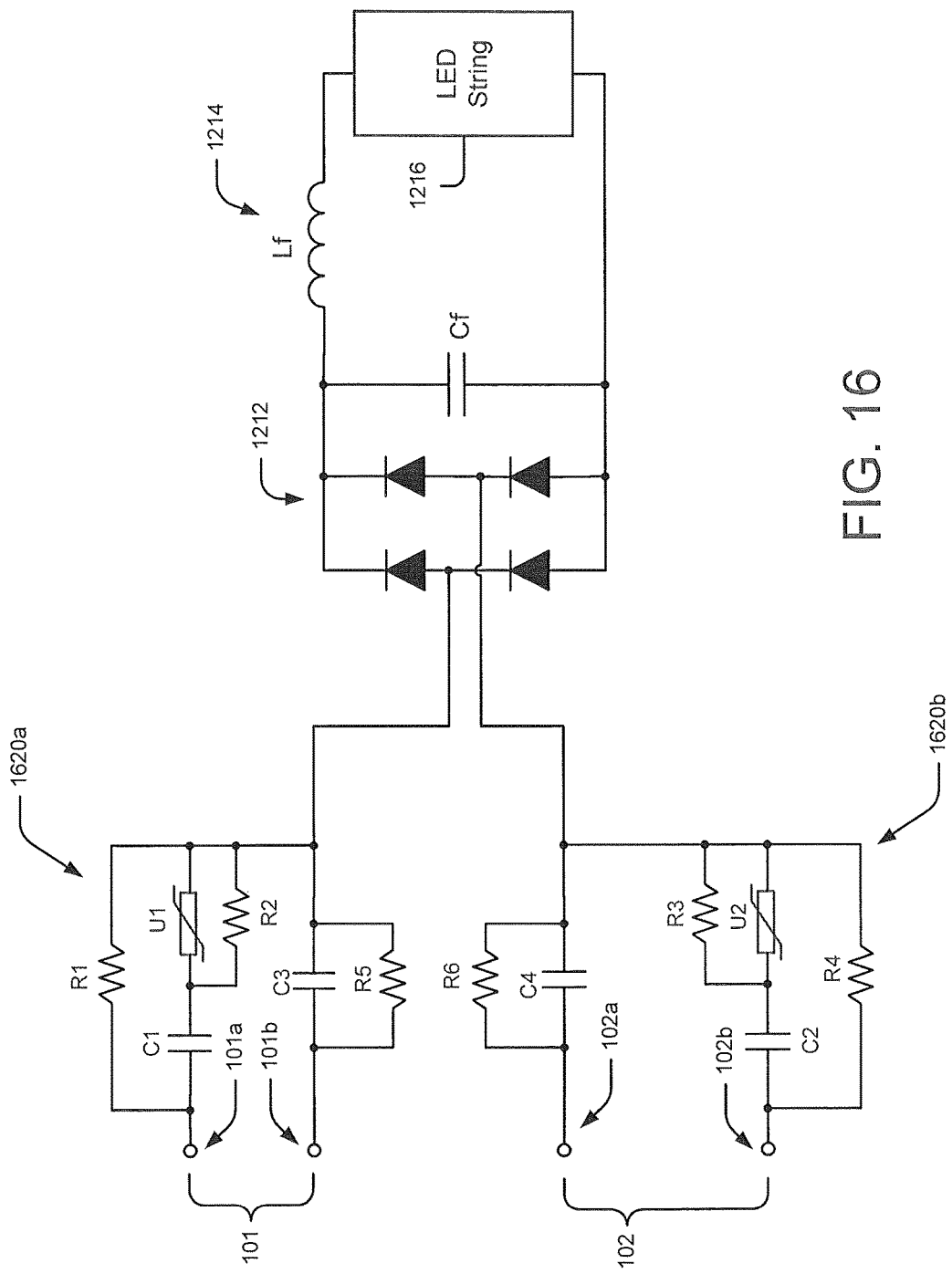

FIG. 16 illustrates another use of a temperature-varying filament-imitating impedance in a lighting apparatus 1600 that includes a rectifier circuit 1212, matching circuit 1214 and LED string(s) 1216 along the lines discussed above with reference to FIG. 13. A first filament-imitating impedance 1620a includes capacitors C1, C3, resistors R1, R2, R5 and PTC resistor U1, and a second filament-imitating impedance 1720b includes capacitors C2, C4, resistors R3, R4, R6 and a PTC resistor U2, coupled to respective terminals of an input port of the rectifier circuit 1212.

Figure 17:
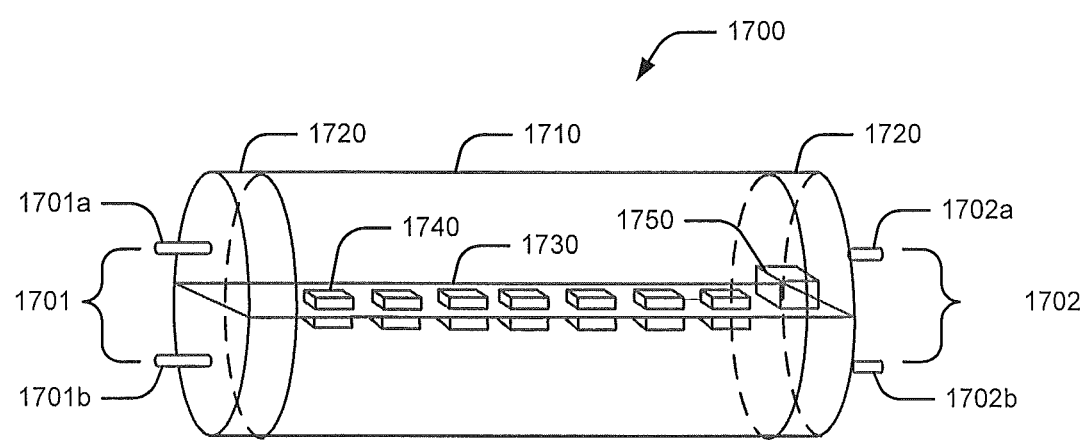
FIG. 17 illustrates a fluorescent tube replacement lamp according to further embodiments.

As noted above, lighting apparatus as described above may be used in fluorescent lamp replacement applications. FIG. 17 illustrates a fluorescent tube replacement lamp 1700 according to some embodiments. The lamp 1700 includes a tubular housing 1710 including a translucent portion 1710a and end caps 1720. The lamp 1700 includes first and second ballast connection ports 1701, 1702 at respective ends of the housing 1710. The first ballast connection port 1710 includes pins 1701a, 1701b and the second ballast connection port 1702 includes pins 1702a, 1701b. LEDs 1740 of an LED string may be mounted on a substrate 1730 positioned within the housing 1710. Coupling circuitry 1750 may be supported by the substrate and connect the LEDs 1740 to the port pins 1710a, 1701b, 1702a, 1702b. The coupling circuitry 1750 may include one or more filament-imitating impedances, a low-frequency blocking impedance, a rectifier circuit and a resonant matching circuit as described above.

It will be appreciated that lamps according to some embodiments of the inventive subject matter may take any of a variety of other forms than the tube type lamp shown in FIG. 17. For example, some embodiments may be configured to for use in fixtures that utilize circular (e.g., T9) lamps or non-integrated compact fluorescent lamps.

Figure 18A:
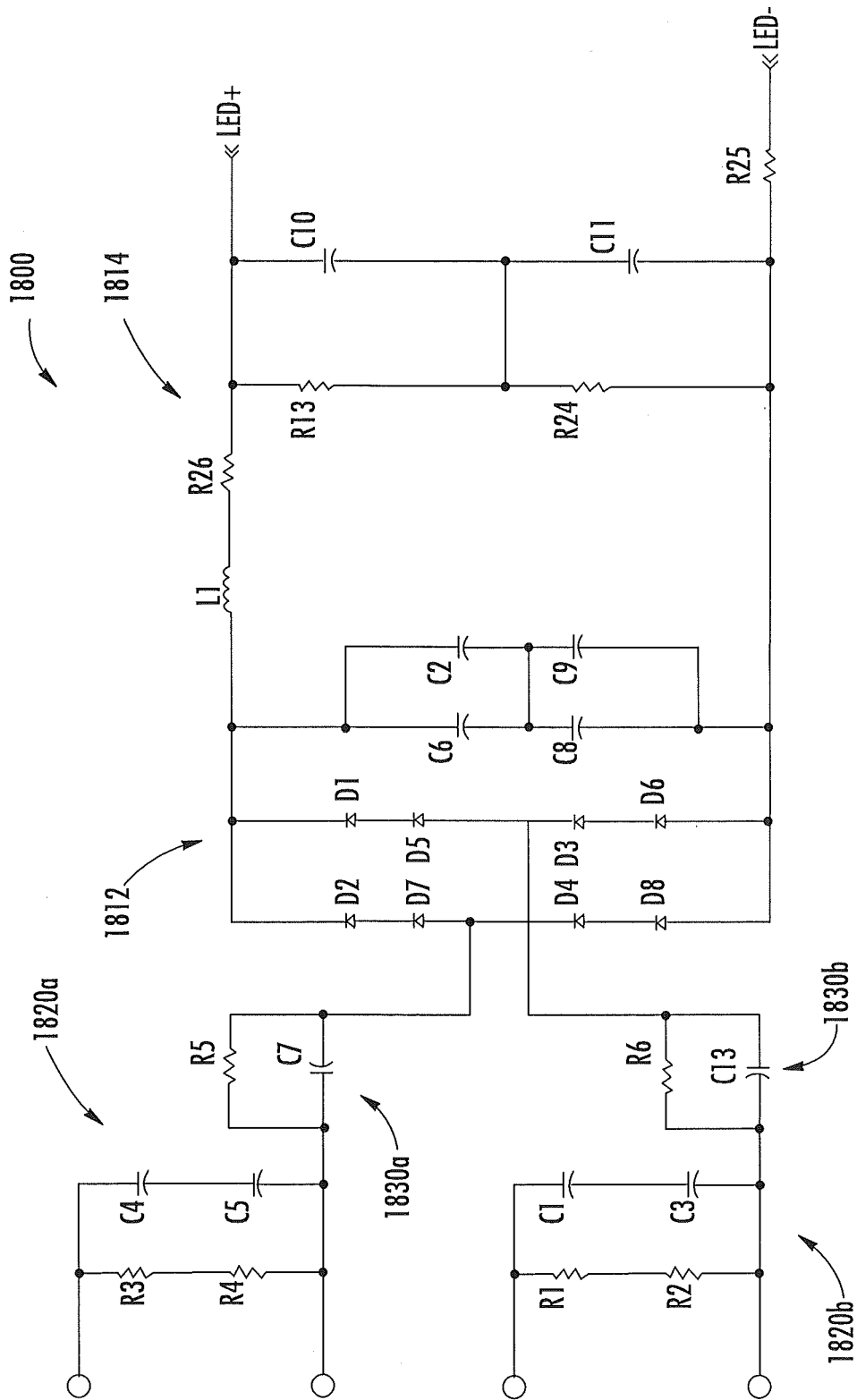
FIGS. 18A-B are schematic diagrams illustrating a lighting apparatus according to further embodiments.
Figure 18B:
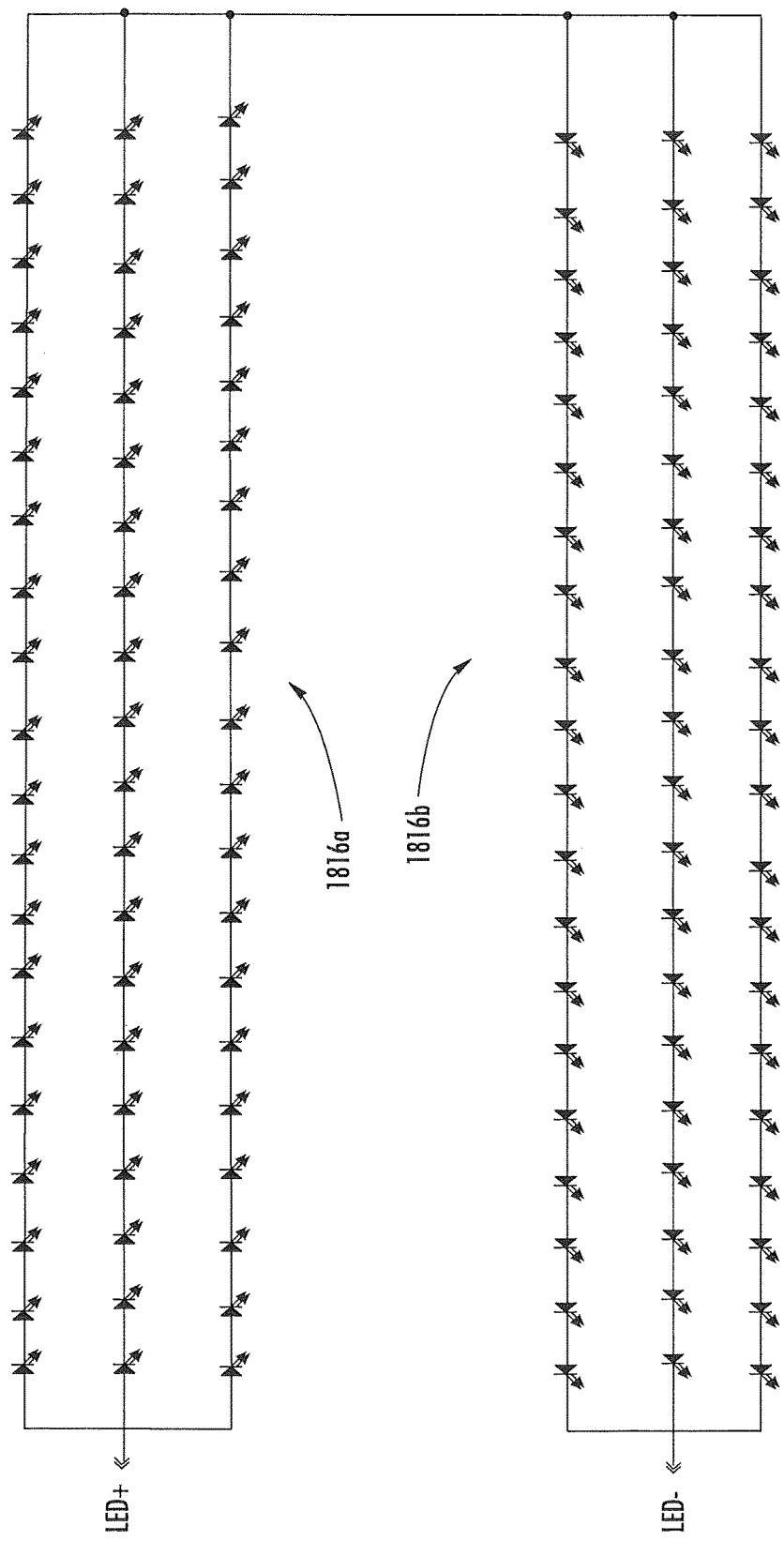

FIGS. 18A-B illustrate a lighting apparatus 1800 according to further embodiments. The apparatus 1800 includes a rectifier circuit 1812, a matching circuit 1814, first and second filament-imitating impedances 1820a, 1820b, and first and second blocking impedances 1830a, 1830b. The rectifier circuit 1812 is a diode bridge including diodes D1-D8. The diode bridge is configured to provide redundancy by including respective serially-connected diode pairs D1/D5, D2/D7, D4/D8, D3/D6 in each branch of the diode bridge. Thus, if one of the diodes in a given branch fails in a shorted condition, the bridge may still operate in an acceptable manner.

The first filament-imitating impedance 1820a includes capacitors C4, C5 and resistors R3, R4. The second filament-imitating impedance 1820b includes capacitors C1, C2 and resistors R1, R2. These circuits are also configured to provide component redundancy by using serially-connected components in each of the circuit branches. For example, if the capacitor C4 shorts, the capacitor C5 may still provide a suitable filament-impedance imitating function to maintain acceptable operation of the apparatus 1800.

The first filament-imitating impedance 1820a is coupled to a first terminal of an input port of the rectifier circuit 1812 by the first blocking impedance 1830a, which includes a capacitor C7 and a resistor R5. The second filament-imitating impedance 1820b includes capacitors C1, C2 and resistors R1, R2 and is coupled to a second terminal of the input port of the rectifier circuit 1812 by the second blocking impedance 1830b, which includes a capacitor C13 and a resistor R6. The first and second blocking impedances 1830a, 1830b also provide redundancy, e.g., if one of the capacitors C7, C13 fails, low-frequency blocking may still be provided by the other capacitor.

Along lines discussed above with reference to FIG. 8, the first and second blocking impedances 1830a, 1830b may be configured to block a lower frequency component that may be provided by the ballast, such as a DC offset produced by the ballast. In some embodiments, the apparatus 1800 may be configured for operation only with high-frequency electronic ballasts, with the blocking impedances 1830a, 1830b configured to block a nominal 60 Hz (or other fundamental) component so that, if the apparatus 1800 is incorrectly connected to a magnetic ballast, transfer of power to the rectifier 1812 may be reduced or prevented, thus preventing damage and/or improper operation.

The matching circuit 1814 includes capacitors C2, C6, C8, C2 and inductor L1, and is configured to be coupled to at least one LED, here an LED string including first and second serially-connected segments 1816a, 1816b. The capacitors C2, C6, C8, C2 are configured to provide serial redundancy, so the matching circuit 1814 may continue to operate in an acceptable manner if one the capacitors C2, C6, C8, C2 shorts out. As further shown, a resistor R26 may be coupled in series with the inductor L1. The value of the resistor R26 may be varied (e.g., by using a variable resistor and/or a component slot in which selected resistor or conductive jumper may be installed during manufacture and/or field installation) to adjust performance of the matching circuit, i.e., the resistor R26 may be selected to tailor the driver circuitry to various different ballasts.

Capacitors C10, C11 may be connected across the output of the matching circuit 1814, and may provide additional smoothing of the output provided to the LED segments 1816a, 1816b. Resistors R13, R24 may be coupled in parallel with respective ones of the capacitors C10, C11, and may be used to discharge the capacitors C10, C11 when power to the apparatus 1800 is removed, thus enabling a crisper turnoff of the LED segments 1816a, 1816b. As further shown, a resistor R25 may be coupled in series with the LED segments 1816a, 1816b. The value of the resistors R25 may be adjusted (e.g., in a manner similar to that described above for the resistor R26) to adjust a load presented to the driver circuitry. For example, the resistor R25 may be varied to allow use of the driver circuitry with different LED loads.

In illustrated embodiments, each of the LED segments 1816a, 1816b includes three parallel connected strings of LEDs, but it will be appreciated that other string arrangements may be used. Each of the strings of LEDs may include LEDs having substantially the same spectral output or a combination of LEDs having different spectral outputs that may be combined to produce a desired aggregate spectral output. The apparatus 1800 may be included in a fluorescent tube replacement lamp along the lines illustrated in FIG. 17.

In the drawings and specification, there have been disclosed typical embodiments of the inventive subject matter and, although specific terms are employed, they are used in a generic and descriptive sense only and not for purposes of limitation, the scope of the inventive subject matter being set forth in the following claims.

What is claimed is:

1. A lighting apparatus comprising:
a housing having at least one translucent portion;
a solid-state lighting circuit within the housing and comprising at least one light emitting diode (LED);
first and second ballast connection ports supported by the housing and configured to be coupled to a ballast;
a first filament-imitating impedance within the housing and having a first terminal coupled to the first ballast connection port;
a first low-frequency blocking impedance within the housing and coupling a second terminal of the first filament-imitating impedance to a first input terminal of the solid-state lighting circuit and configured to block at least one component having a frequency of about 60 Hz or less;
a second filament-imitating impedance within the housing and having a first terminal coupled to the second ballast connection port; and
a second low-frequency blocking impedance within the housing and coupling a second terminal of the second filament-imitating impedance to a second input terminal of the solid-state lighting circuit and configured to block at least one component having a frequency of about 60 Hz or less.

2. The apparatus of claim 1, wherein the first and second filament-imitating impedances each comprise at least one capacitor.

3. The apparatus of claim 2, wherein the first and second filament-imitating impedances are configured to transfer power at a nominal frequency of an output produced by the ballast and to provide impedances at the first and second ballast connection ports that prevent shutdown of the ballast.

4. The apparatus of claim 2, wherein capacitances provided at the respective first and second ballast connection ports is in a range from about 0.1 µF about 4 µF.

5. The apparatus of claim 2, wherein each of the first and second filament-imitating impedances further comprises at least one resistor coupled in parallel with the at least one capacitor thereof.

6. The apparatus of claim 1, where each of the first and second low-frequency blocking impedances are configured to block a DC offset.

7. The apparatus of claim 1, wherein the each of the first and second low-frequency blocking impedances is configured to block a nominally 60 Hz frequency component.

8. The apparatus of claim 1, wherein each of the first and second low-frequency blocking impedances comprises at least one capacitor.

9. The apparatus of claim 8, further comprising respective resistors coupled in parallel with the at least one capacitors of the first and second low-frequency blocking impedances.

10. A fluorescent replacement lamp comprising the apparatus of claim 1, wherein the first and second terminals of the first and second ballast connection ports comprise respective pins configured to be connected to a fluorescent lamp connector.

11. The apparatus of claim 1, wherein the solid-state lighting circuit comprises;
    a rectifier circuit having an input port coupled to the first and second low-frequency blocking impedances; and
    wherein the at least one light emitting diode (LED) is coupled to an output port of the rectifier circuit.

12. The apparatus of claim 11, wherein the solid-state lighting circuit further comprises a matching circuit.

13. The apparatus of claim 12, wherein the matching circuit comprises:
    at least one capacitor coupled in parallel with the output port of the rectifier circuit; and
    at least one inductor coupled between the at least one capacitor and the at least one LED.

14. The apparatus of claim 12, wherein the matching circuit comprises series-connected redundant components.

15. The apparatus of claim 11, wherein the at least one LED comprises at least one LED string.

16. The apparatus of claim 11, further comprising at least one smoothing capacitor coupled in parallel with the output of the rectifier circuit.

17. The apparatus of claim 16, further comprising at least one resistor coupled in parallel with the smoothing capacitor.

18. The apparatus of claim 1, wherein the first and second filament-imitating impedances comprise series-connected redundant components.

19. A lighting apparatus comprising:
    a housing having at least one translucent portion;
    a solid-state lighting circuit within the housing and comprising at least one LED;
    at least one ballast connection port supported by the housing; and
    at least one low-frequency blocking impedance within the housing and coupling the at least one ballast connection port to the solid-state lighting circuit and configured to block at least one component having a frequency of about 60 Hz or less.

20. The apparatus of claim 19, where the at least one low-frequency blocking impedance is configured to block a DC offset.

21. The apparatus of claim 19, wherein the at least one low-frequency blocking impedance is configured to block a nominally 60 Hz frequency component.

22. The apparatus of claim 19, wherein the at least one low-frequency blocking impedance comprises at least one capacitor.

23. The apparatus of claim 22, further comprising at least one resistor coupled in parallel with the at least one capacitor.

24. The apparatus of claim 19, further comprising a filament-imitating impedance coupling the at least one ballast connection port to the at least one low-frequency blocking circuit.

25. The apparatus of claim 19, wherein the solid-state lighting circuit comprises:
    a rectifier circuit having an input port coupled to the at least one low-frequency blocking impedance; and
    wherein the at least one LED is coupled to an output port of the rectifier circuit.

26. The apparatus of claim 25, wherein the solid-state lighting circuit further comprises a matching circuit.

27. The apparatus of claim 26, wherein the matching circuit comprises:
    at least one capacitor coupled in parallel with the output port of the rectifier circuit; and
    at least one inductor coupled between the at least one capacitor and the at least one LED.

28. The apparatus of claim 27, further comprising a resistor coupled in series with the inductor.

29. The apparatus of claim 19, wherein the at least one ballast connection port comprises a first ballast connection port and a second ballast connection port and wherein the low-frequency blocking impedance comprises a first low-frequency blocking impedance coupling the first ballast connection port to a first terminal of the solid-state lighting circuit and a second low-frequency blocking impedance coupling the second ballast connection, port to a second input terminal of the solid-state lighting circuit.

30. The apparatus of claim 29, where each of the first and second low-frequency blocking impedances are configured to block a DC offset.

31. The apparatus of claim 29, wherein the each of the first and second low-frequency blocking impedances is configured to block a nominally 60 Hz frequency component.

32. The apparatus of claim 29, wherein each of the first and second low-frequency blocking impedances comprises at least one capacitor.

33. The apparatus of claim 32, further comprising respective resistors coupled in parallel with the at least one capacitors of the first and second low-frequency blocking impedances.

* * * * *